UNITED STATES PATENT OFFICE.

HIRAM TUCKER, OF CAMBRIDGEPORT, MASSACHUSETTS.

IMPROVEMENT IN PREPARING STONE IN IMITATION OF MARBLE.

Specification forming part of Letters Patent No. 9,255, dated September 7, 1852.

*To all whom it may concern:*

Be it known that I, HIRAM TUCKER, of Cambridgeport, in the county of Middlesex and State of Massachusetts, have invented a new and useful improvement or process for preparing slate, stone, or other absorbent mineral for the reception of paints or colors, or many other substances applied to it for sundry purposes; and I do hereby declare that the same is fully described in the following specification.

In preparing slate-stone in imitation of marble or other varied stone I have found that japan or colors applied to it in the ordinary way are liable to crack and peel off or become easily detached. This difficulty has been so serious as to almost prevent the employment of slate for such purposes, and particularly in the manufacture of plain or ornamented paneled mantel-pieces.

To remedy the evil and to produce a much greater induration of the surface of the stone in a very much less time, and to prepare the stone for better reception of colors and retention of them than can be effected by the ordinary process of japanning, I cover it with linseed or some other proper drying-oil, and introduce the article or slate-stone so covered into an oven heated to such a degree of heat as will burn or char the oil, and I slowly bake and burn the oil thereon; or I burn such oil by heat or other means applied to it in any other proper way. After thus treating the stone it will be found to have attained a very material increased induration of its surface or that part of it on which the oil has been applied, the burning of the oil producing such induration. I next put on such indurated surface the paints or colors that are to imitate the veins or irregularities of marble or any stone I may desire to imitate, and dry the same thereon. This done, I cover the whole with one or more coatings of black or other colored japanning and bake the same in an oven in the ordinary way. I next grind down the surface until the japanning is removed from the vein-colors under it and remains on the hard oil-surface between them, thus producing a level surface and beautiful imitation of marble or other stone.

From the above it will be seen that I do not apply the veining-colors and ground-colors in the usual way, which is to put them all on a surface at once or one time and stipple them together at their edges, the ground-color not covering the veining-colors, except a little at their edges or where they unite; but I first put on the veining-colors, and next, when they are dry, cover them and the spaces of stone between them with an entire covering of ground-color, afterward grinding the ground-color off from the veining-colors, which stand out from the surface of the stone, so as to admit of the same. In this way I obtain very perfect edges of the veining-colors, and by such means produce closer and better imitations of veins than can usually be effected by the common plan, as above detailed.

What I claim as my invention is—

1. The improvement in preparing the surface of the slate or absorbent stone or mineral matter for better receiving and retaining colors, and for its quicker and better induration than by the ordinary process of baking oil or japan on it, the same consisting in applying a drying oil or vehicle to it, as above set forth, in combination with baking it and charring it, or with burning it thereon, essentially as above specified, the charring or burning the oil being the principle of my invention or discovery under the circumstances as stated.

2. The improvement in applying the veining and ground colors to such indurated surface or other surface, the same consisting in applying the graining-colors first and drying them on, in combination with subsequently covering the whole surface, together with such veining-colors, with one or more coats of black or other colored japanning, and after the same has been dried grinding down japanning from the veining-colors and leaving it between them so as to form a ground, as stated.

In testimony whereof I have hereto set my signature this 24th day of February, A. D. 1852.

HIRAM TUCKER.

Witnesses:
  R. H. EDDY,
  FRANCIS GOULD.